Jan. 18, 1955 K. C. BUGG Re. 23,924

TOBACCO PIPE

Original Filed May 8, 1947

INVENTOR.
Kerily C. Bugg,
BY Aikinson, Huxley
Byron & Hume
Attys.

United States Patent Office

Re. 23,924
Reissued Jan. 18, 1955

23,924

TOBACCO PIPE

Kenly C. Bugg, Fort Wayne, Ind., assignor to Falcon Industries, Inc., Fort Wayne, Ind., a corporation of Indiana Original No. 2,581,169, dated January 1, 1952, Serial No. 746,759, May 8, 1947. Application for reissue December 18, 1953, Serial No. 399,183

9 Claims. (Cl. 131—194)

Matter enclosed in heavy brackets [ ] appears in the original patent but forms no part of this reissue specification; matter printed in italics indicates the additions made by reissue.

*This is an application for reissue of Patent No. 2,581,169, issued January 1, 1952, on, application Serial No. 746,759, filed May 8, 1947.*

This invention pertains to smoker's articles and more particularly to inventions in pipes.

It is an object of this invention to provide a smoker's article such as a pipe which is light weight, is balanced and of attractive design.

Another object of this invention is to provide a smoker's article such as a pipe which is precision built so that different bowls may be used with the same holder.

Another object of this invention is to provide a smoker's article such as a pipe which is so constructed that moisture is trapped away from the bowl so that the bowl does not becme sour.

Another object of this invention is to provide a smoker's article such as a pipe which is so constructed that all tobacco is retained in the bowl and is prevented from reaching the smoker.

Another object of this invention is to provide a smoker's article such as a pipe which is so constructed that a condensing plug or dome forms part of the bowl holder whereby substantially all condensation takes place in a main trap provided between the bowl and holder.

Another object of this invention is to provide a smoker's article such as a pipe wherein a removable draw tube is provided so constructed that it performs the functions of a spoon, trap and cooling device and is immovably held in position by the holder and bit.

Another object of this invention is to provide a smoker's article such as a pipe which is easily cleaned and wherein parts are readily replaceable.

Another object of this invention is to provide a smoker's article such as a pipe which is so constructed that tobacco condensate and other liquid does not reach the smoker even though the article is used by a "wet smoker."

Another object of the invention is to provide a smoker's article such as a pipe wherein the smoke conducting member is exposed to the atmosphere and is relatively thin walled, yet the body portion is so constructed that it forms a rigid support and adequately protects the draw tube of the pipe.

Another object of the invention is to provide a smoker's article, such as a pipe wherein the smoke conducting member is a highly efficient heat transfer means whereby a rapid condensing effect is attained.

Another object of the invention is to provide a smoker's article such as a pipe wherein the parts, including the smoke conducting member, are easily disassembled.

Another object of the invention is to provide a pipe wherein the bowl to body fastening means cannot be jammed by the user and can be assembled and reassembled quickly and easily, as by the use of multiple threads, the optimum number being determined by the thread running length.

Another object of the invention is to provide a pipe made of composite materials wherein a metal body is utilized and a bowl of different material such as wood, corn-cob or the like is threaded to the body, the threads between the bowl and body being of different materials so as to eliminate seizure.

*Another object of the invention is to provide a pipe having a stem construction that is relatively flat, with its*

*greatest dimension of breadth disposed horizontally when the axis of the bowl is substantially vertical, thus to repose naturally between the fingers of a smoker in a manner that reduces to a minimum the tendency of the pipe to turn while so held.*

With these and various other objects in view, the invention may consist of certain novel features of construction and operation as will be more fully described and particularly pointed out in the specification, drawings and claims appended hereto.

In the drawings which illustrate embodiments of the device and wherein like reference characters are used to designate like parts:

*Application Serial No. 746,759 was a* [This application is a] continuation-in-part of application Serial No. 594,701, filed May 19, 1945, for Smoker's Articles, which application is now abandoned.

Figure 1:
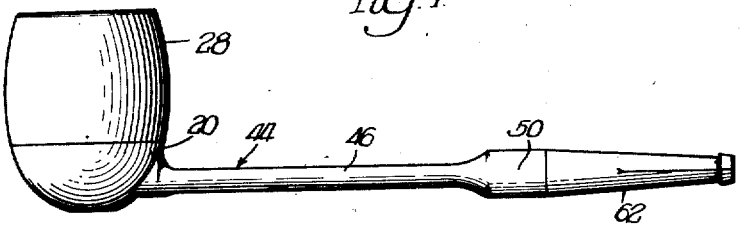
Figure 1 is a side elevation of one form of pipe embodying the invention.
Figure 3:
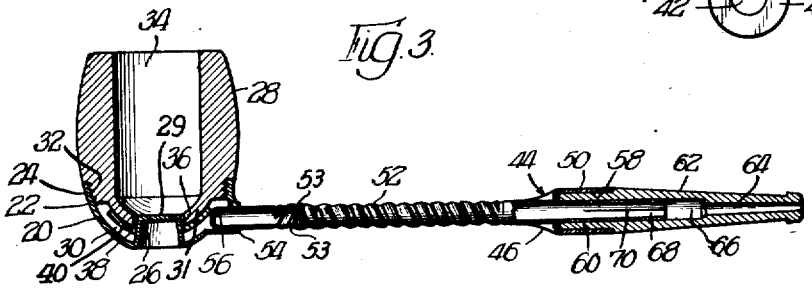
Figure 3 is a longitudinal sectional elevation taken substantially in the plane as indicated by the line 3—3 of Figure 2 but showing a portion of the draw tube in elevation.

The pipe disclosed herein comprises a metal, dished bowl holder 20 provided with a bowl supporting portion 22 which in the embodiment shown is dished, being provided with an upper threaded portion 24 and a lower condensing plug or dome 26, which preferably is disposed on the center line of the bowl 28 at the lowest point thereof. Said plug, as shown, is substantially cylindrical or frusto-conical, is re-entrant and is preferably cast integral with the bowl holder. The plug 26 being re-entrant, is open at the bottom thereof to the atmosphere and projects upwardly within the bowl holder 20. Therefore, when the bowl 28 is in place, as shown in Figure 1, there is a relatively large cooling surface adjacent the bottom of the bowl, as the plug extends upwardly within the holder and the top 29 of the plug forms a portion of the bottom of the bowl. Thus the major portion of the condensing takes place in the main trap portion 30 between the bottom wall 31 of the bowl 28 and the bowl holder 20. Wall 31 of the bowl 28 is preferably dished or shaped in a manner to substantially conform to the shape of the bowl holder, so that when the bowl is in position as shown in Figure 3, the trap portion 30 is of substantial magnitude. The bowl 28 is provided with corresponding threads 32 for securing the bowl to the threads of the threaded portion 24, it being understood, of course, that a press or other fit may be used.

In the construction shown the threads of the metal bowl holder are metal, while the material of the mating threads of the bowl are of different material such as wood, corn-cob and the like, depending upon the material from which the bowl and its threads are formed, and because of the difference in material between the mating threads of the holder and bowl there is no tendency for galling of the threads. Further, in the construction shown even though there is a relatively short length of thread, a quadruple thread is provided which makes it possible to entirely set the bowl by a quarter turn of the bowl, and in addition gives four entrances to the thread of the bowl, and as a multiple thread provides a construction of lesser mechanical advantage than a single thread for the same thread length, the present construction eliminates a possibility of too tightly setting the bowl on the body. It is understood that while four threads are used, the optimum number of threads is determined by the thread running length, which in the construction shown amounts to four threads.

The tobacco receiving portion or recess 34 of the bowl terminates in an opening or aperture 36 which is of similar shape (shown substantially cylindrical) to the condenser plug 26, and when the bowl is fastened to the holder, in its operative position, the plug preferably extends within the aperture 36 and is flush with the bottom of the bowl. The plug is of slightly less diameter than the diameter of the opening 36 and thus a small peripheral opening 38 is provided which prevents the entry of tobacco into the holder, though the opening 38 actually is of substantially the same area as that of the ordinary draw hole in a conventional pipe.

Figure 6:
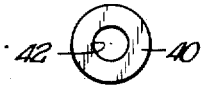
Figure 6 is a top plan view of a filter disk for use in the pipes disclosed herein.

In its operative position the bottom wall 31 of the bowl is preferably arcuate or of substantially the same shape as the bowl holder, the wall 31, when the bowl is in position as shown in Figure 1 being slightly spaced from the dished supporting portion 22, forming the main trap 30 for moisture, condensate and the like, it being understood of course that a filter such as the disk filter 40 (Figure 6) of absorbent material may be inserted around the plug, the filter being apertured at 42 to embrace the plug 26. The filter 40 is shown in position in Figure 3.

The bowl is preferably made of a suitable briar, but other material, of course, may be used such as clay, meerschaum, corn-cob, etc., and the bowl holder is preferably of a light material such as aluminum. The bowl holder is also provided with a stem 44 comprising, for its major intermediate portions, spaced stem or side members or portions 46 which merge adjacent the bowl supporting portion as at 48 and at the opposite end as at 50.

Figure 2:
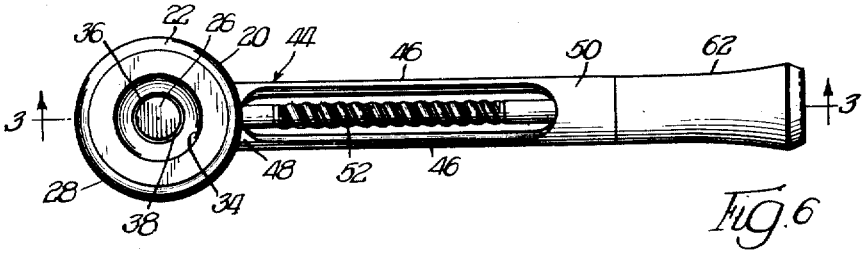
Figure 2 is a top plan view of the pipe illustrated in Figure 1.

A draw tube 52 shown in Figures 2 and 3 as being corrugated in a spiral shape, which in effect provides a continuous weir 53, is adapted to be inserted into the passage 54 of the bowl supporting portion which communicates with the trap 30. The end of the tube 52 extending into the passage 54 is drawn down or tapered as at 56 and the size of the passage 54 and tube is such as to provide a tight fit. The tapered end 56 prevents a whistle when the pipe is being smoked and greatly lessens the danger of condensate running from the trap into the draw tube, and the corrugated effect of the spiral of the draw tube not only provides progressive traps but performs a cooling function.

The portion 50 is provided with the opening 58 for receiving the end 60 of the bit 62 which may be a press, screw or other fit, the passage 64 through the bit being preferably enlarged as at 66 to receive the end 68 of the draw tube 52 which is preferably split a short way from the end as at 70 and is sprung or tightly fitted into the passage 66. The bit, of course, is of any desired material, such as hard rubber, amber, Bakelite and the like, and it is seen that in cleaning, the bit and tube may be removed and replaced as a unit.

Figure 4:
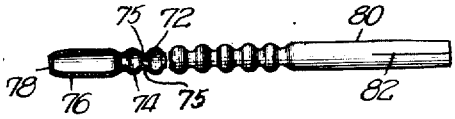
Figure 4 is a fragmentary elevation of a modified form of draw tube for the pipe embodying the invention.

In Figure 4 a draw tube 72 is shown wherein separate corrugations 74 are provided forming traps separated by separate weirs 75, the bowl end 76 of said tube being drawn down or tapered as at 78, and the bit end 80 being slit as at 82 for tightly fitting that end into the passage 66 of the bit 62.

The tube as well as the bowl holder and stem is preferably of a light weight metal such as aluminum, magnesium and the like. *The longitudinal axes of the components of the stem are disposed in a substantially horizontal plane when the axis of the bowl is disposed in the vertical, thus to define a substantially flat structure to facilitate handling thereof by the fingers of a smoker to minimize the tendency for the pipe to turn from the optimum smoking position, thus to prevent accidental spillage of the contents of the bowl.*

Figure 5:
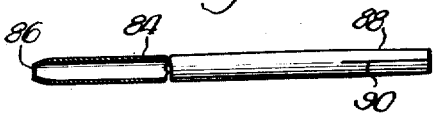
Figure 5 is a fragmentary elevation of another modified form of draw tube for a pipe embodying the invention.

In Figure 5 a plain draw tube 84 is shown having the drawn down or tapered end 86, similar to end 56, adapted to be received within the passage 54. The opposite end 88 of the tube 84 is formed similarly to the tube 52, being slit as at 90 for tightly fitting said tube end into the passage 66 in the bit 62.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

I claim:

1. A pipe comprising a dished bowl holder formed of thin metal, *the exterior surfaces of which are exposed to the ambient atmosphere,* said bowl holder having a flat topped raised central hollow condensing dome, the holder having a lateral draw tube receiving opening formed therein at a point spaced above the bottom of [the] *a trap* chamber about the condensing dome, and a bowl fitting within the dished outer walls of the bowl holder, the bowl having a circular lower opening formed therein, said opening being of such size as to form a circumferential, narrow opening about the condensing dome, the upper wall of the dome being in substantially the plane of the lower *edge of the* inner wall of the bowl, said lower bowl wall being spaced above the lower circumferential portion of the dished bowl holder to form [a] *said* trap chamber.

2. A pipe comprising a dished bowl holder formed of thin metal, *the exterior surfaces of which are exposed to the ambient atmosphere,* said bowl holder having a central flat topped hollow condensing dome surrounded by a circular trap chamber, enclosed by the outer dished walls of the bowl holder, the holder having a lateral draw tube receiving opening formed in the outer dished walls at a point above the bottom of the trap chamber, and a bowl fitting within the upper portion of the bowl holder and secured to the outer walls thereof, the bowl having a downwardly and inwardly extending lower flange spaced above the lower wall of the trap chamber, said flange forming the upper wall of said *trap* chamber, the inner edge of said flange forming a circular opening and spaced from the condensing dome to form a circumferentially extending opening about said dome, *the edge of* the upper face of the lower bowl flange extending inwardly in substantially the plane of the top of the condensing dome.

3. A pipe comprising a dished bowl holder formed of metal, a bowl fitted in the holder, *said bowl having a passage leading therefrom* [a passage leading from the bowl], the holder having a lateral opening formed therein, spaced metal stem members extending from the bowl holder on opposite sides of the opening, a cup like bit receiving member forming the outer ends of the stem members, [an opening in] said bit receiving *member having an opening* in alignment with the lateral opening in the bowl holder, a bit fitted in the bit receiving member and a draw tube of metal between and spaced from the stem members, said draw tube having its ends detachably fitted in the opening in the bowl holder and in the bit.

*4. A pipe comprising a dished bowl holder formed of thin metal, the exterior surfaces of which are exposed to the ambient atmosphere, said bowl holder having a flat topped raised central condensing dome, the holder having a lateral draw tube receiving opening formed therein at a point spaced above the bottom of a trap chamber about the condensing dome, and a bowl fitting within the dished outer walls of the bowl holder, the bowl having a circular lower opening formed therein, said opening being of such size as to form a circumferential, narrow opening about the condensing dome, the upper wall of the dome being in substantially the plane of the lower edge of the inner wall of the bowl, said lower bowl wall being spaced above the lower circumferential portion of the dished bowl holder to form said trap chamber.*

*5. A pipe comprising a dished bowl holder formed of thin metal, the exterior surfaces of which are exposed to the ambient atmosphere, said bowl holder having a central flat topped condensing dome surrounded by a circular trap chamber, enclosed by the outer dished walls of the bowl holder, the holder having a lateral draw tube receiving opening formed in the outer dished walls at a point above the bottom of the trap chamber, and a bowl fitting within the upper portion of the bowl holder and secured to the outer walls thereof, the bowl having a downwardly and inwardly extending lower flange spaced above the lower wall of the trap chamber, said flange forming the upper wall of said trap chamber, the inner edge of said flange forming a circular opening and spaced from the condensing dome to form a circumferentially extending opening about said dome, the edge of the upper face of the lower bowl flange extending inwardly in substantially the plane of the top of the condensing dome.*

*6. A pipe comprising a dished bowl holder formed of metal, a bowl fitted in the holder, said bowl having a passage leading therefrom, the holder having a lateral opening formed therein, spaced metal stem members extending from the bowl holder on opposite sides of the opening, a cup like bit receiving member forming the outer ends of the stem members, said bit receiving member having an opening in alignment with the lateral opening in the bowl holder, a bit fitted in the bit receiving*

*member and a draw tube of metal between and spaced from the stem members, said draw tube having its ends fitted in the opening in the bowl holder and in the bit.*

*7. A pipe comprising a dished bowl holder formed of metal, a bowl removably fitted in the holder, said bowl holder having a stem comprised of a pair of spaced parallel metal extensions connected to said holder with the longitudinal axes of the extensions in substantially the same horizontal plane when the axis of said bowl is substantially upright, said extensions terminating in a bit receiving portion, a bit secured to the latter portion, said bowl holder, bit receiving portion, and bit having bores therethrough aligned about an axis passing centrally between said extensions, and a draw tube connecting the bore in the bowl holder with the bores through said bit receiving portion and bit, said draw tube lying between said extensions in parallel relation thereto with its longitudinal axis lying in the horizontal plane common to the axes of said extensions.*

*8. The invention of claim 7 further including a chamber defined by the bottom outside portions of said bowl and the bottom inside portions of said bowl holder when the bowl is secured to the latter, said bowl having an opening connecting the interior of the bowl with said chamber, said bowl holder having a plug at its center extending upwardly into said bowl opening to a level where the top of said plug lies adjacent the bottom interior surfaces of said bowl, the boundaries of said bowl opening being spaced from said plug to define the smoke passageway.*

*9. A smoking pipe comprising metallic bowl and stem sections, said bowl section being cup-shaped, and having the stem section extending laterally therefrom, said stem section comprising a member having a smoke passage communicating with the bowl section, and supporting elements on opposite sides of and in spaced relation to said*

*member, of substantially the same length as said member, and a mouth-piece attached to said stem and having a passage in communication with the smoke passage of said member, said member and spaced supporting elements defining generally a substantially flat horizontal structure to facilitate handling thereof by the fingers of a smoker to reduce to a minimum the turning of the pipe when the pipe is held in normal usage so as to prevent spillage of the contents from the bowl section.*

References Cited in the file of this patent or the original patent

UNITED STATES PATENTS

| | | |
|---|---|---|
| D. 142,280 | Bugg | Aug. 21, 1945 |
| 165,814 | Fritz | July 20, 1875 |
| 580,989 | Paine | Apr. 20, 1897 |
| 642,963 | Datow | Feb. 6, 1900 |
| 675,594 | Flint | June 4, 1901 |
| 719,920 | Watson | Feb. 3, 1903 |
| 1,397,958 | Hanable | Nov. 22, 1921 |
| 1,510,003 | Johnson | Sept. 30, 1924 |
| 1,658,728 | Lyon | Feb. 7, 1928 |
| 1,763,185 | Sasser | June 10, 1930 |
| 1,780,029 | Milkie | Oct. 28, 1930 |
| 2,040,704 | Modine | May 12, 1936 |
| 2,061,786 | Vollmann | Nov. 24, 1936 |
| 2,158,301 | Page | May 16, 1939 |
| 2,231,176 | Ballin | Feb. 11, 1941 |

FOREIGN PATENTS

| | | |
|---|---|---|
| 1,550 | Sweden | Jan. 26, 1889 |
| 57,501 | Sweden | Sept. 16, 1924 |
| 136,028 | Austria | Dec. 27, 1933 |
| 677,356 | Germany | June 23, 1939 |
| 712,394 | Germany | Oct. 17, 1941 |